Nov. 30, 1954  C. A. ELLIS  2,695,475
MEANS AND METHOD OF HARDENING GLASS ARTICLES
Filed Oct. 21, 1949
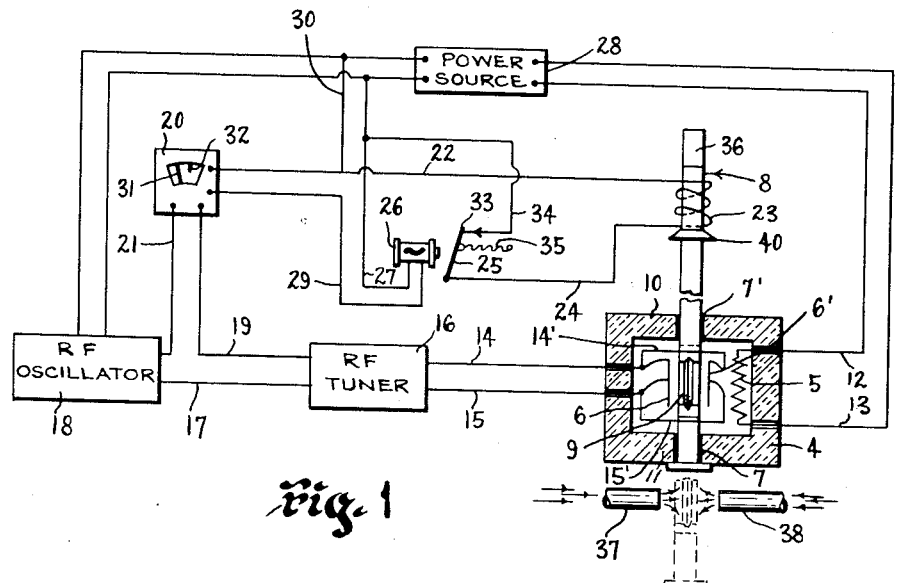
*Fig. 1*
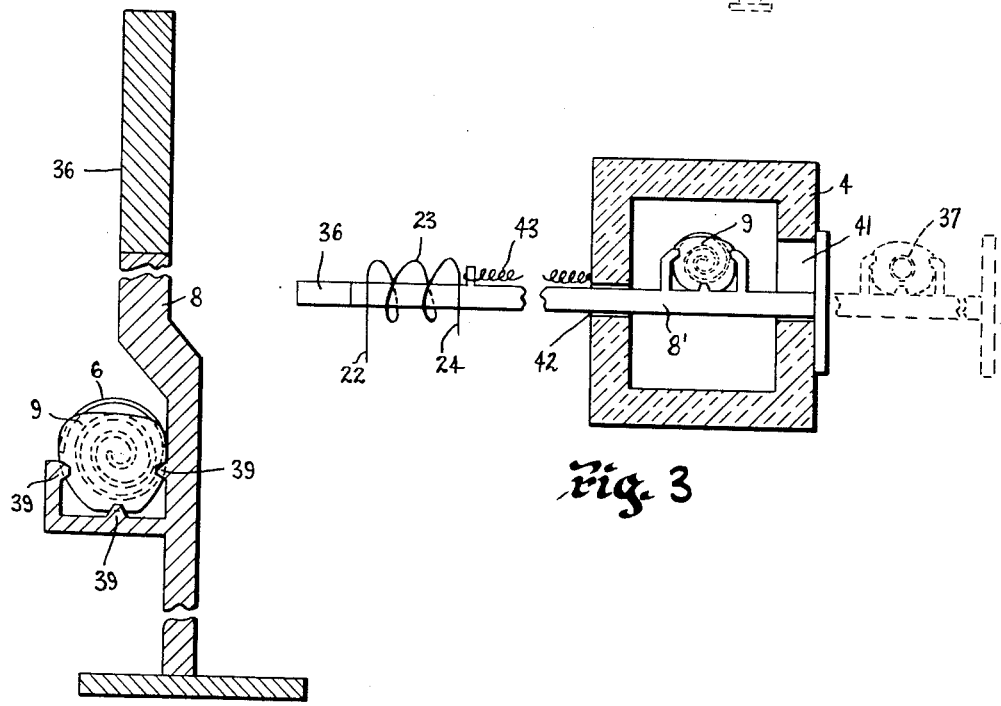
*Fig. 2*
*Fig. 3*
INVENTOR
CHARLES A. ELLIS
BY
Louis L. Gagnon
ATTORNEY 
United States Patent Office 2,695,475
Patented Nov. 30, 1954

2,695,475
MEANS AND METHOD OF HARDENING GLASS ARTICLES

Charles A. Ellis, Southbridge, Mass., assignor to American Optical Company, Southbridge, Mass., a voluntary association of Massachusetts Application October 21, 1949, Serial No. 122,798

12 Claims. (Cl. 49—45)

This invention relates to glass hardening or tempering and has particular reference to novel means and method of hardening or tempering glass articles such as lenses, plates or the like.

The present application is a continuation in part of my copending application, Serial No. 551,685, filed August 29, 1944, and now abandoned.

A principal object of the invention is to provide novel means and methods of hardening and tempering glass articles such as lenses whereby the cycle of heating may be automatically controlled.

Anotehr object is to provide a device for heating glass articles which are to be hardened or tempered whereby the cycle of heating is self-regulating according to the thickness and size of the article being heat treated.

Another object is to provide an electrically controlled heating device for hardening glass articles such as lenses whereby the lenses are electrically retained in the heating unit and the heat generated therein is automatically controlled by the rate of change of resistance of said glass article with respect to the temperature changes.

Another object is to provide means in such an electrically controlled apparatus for automatically ejecting the glass article from the heating unit when the desired temperature is reached.

Another object is to associate air blast producing means with a device of the above character whereby the ejected glass article or lens will receive the proper quenching or tempering when ejected from the heating unit.

Another object is to automatically control the position of the glass article or lens with respect to the heating unit and the quenching means during the operation of the device.

Another object is to provide novel means and methods of regulating the temperature to which the object is subjected during the heat treatment.

Other objects and advantages of the invention will become apparent from the following description taken in connection with the accompanying drawings and it will be apparent that many changes may be made in the details of construction, arrangement of parts and steps of the processes or methods shown and described without departing from the spirit of the invention as expressed in the accompanying claims. I, therefore, do not wish to be limited to the exact details of construtcion, arrangement of parts and methods shown and described as the preferred form only has been given by way of illustration.

Referring to the drawings:

Fig. 1 is a diagrammatic view of the device illustrating the correlation of the parts of the invention;

Fig. 2 is a side elevational view of the work holding means of the device and illustrating the position of the article or lens with respect to the heating inductors of said device; and Fig. 3 is a side elevational view of the heating chamber showing a modification thereof wherein the work support is movable through a horizontal plane into and out of the chamber.

In hardening or tempering glass articles such as plates or lenses, the article is first heated and then rapidly chilled to place the outer surfaces of the lens under compression and its interior under tension. Several different devices have been fabricated in the past for controlling the temperature and heating cycle to which the glass article was subjected prior to quenching to obtain the desired degree of tempering. Such devices, however, as far as is known, have been more of a mechanical arrangement for obtaining the results desired and the controlling means of such devices were dependent upon the temperature indications as derived from the furnace or the time interval for which the article was allowed to remain in the furnace. This was not always satisfactory as such devices gave no indication or regulation of the actual temperature change taking place in the article itself and as a result the article was not always quenched at its optimum temperature.

One of the prime objects of the invention, therefore, is to provide automatic functioning means for heating the article and quenching it when this optimum temperature of heating in the article itself has been reached.

Referring more particularly to the drawings wherein like characters of reference designate like parts throughout the several views, the device embodying the invention comprises a heating compartment 4 having a pre-heating element 5 and a pair of induction coils 6 and 6' therein. The said heating compartment 4 is provided with aligned openings 7 and 7' in which is reciprocally mounted a work support 8 in which the article or lens 9 to be heat treated is supported.

The aligned openings 7 and 7' are preferably formed in the upper and lower walls 10 and 11 of the heating compartment 4 with the support 8 retained in a vertical position.

The pre-heating element 5 is preferably in the form of a resistance coil and is connected by suitable lead wires 12 and 13 to a suitable source of electrical energy 28, although any other suitable heat generating means might be used to preheat the lens 9.

High frequency induction coils 6 and 6' are mounted in the heating compartment 4 so that they will be aligned with and on the opposed sides of the article or lens 9 being treated when positioned in the compartment 4. Said coils as opposed to heating element 5 which function to generate heat, are adapted to respond to the action of heat and are so located relative to the surfaces of the article or lens 9 that when the article 9 has been sufficiently heated, the said coils 6 and 6' will induce surface currents therein. These surface currents because of their high frequency will have little depth of penetration and heating caused by them will be confined to the surfaces of the article or lens 9. This permits the surfaces to be heated above the interior temperature of the lens 9 which will give the ideal condition for quenching. The coils are both preferably of spiraling shape and arranged to lie in substantially flat planes although they may be cupped slightly so as to conform to the general shape of the adjacent surface of the lens 9. Thus one coil would be slightly convexed toward the lens and the other slightly concaved where a meniscus shaped lens was being treated. In some instances, it may also be desirable to have the central portion of the coils closer to the lens than the outer portions thereof. It might also be desirable to so mount the induction coils 6 and 6' for relative movement toward and away from each other to permit accommodation of the device to different thicknesses of lenses. Obviously the coils should not be so close to the lenses as to produce a pattern in the surfaces thereof. However, as an alternative to adjusting the relation of coils 6 and 6', the tuning of the circuit regulator 16 might be regulated instead. Said circuit regulator 16 is connected to coil 6 through lead wires 14 and 15 and to coil 6' by additional lead wires 14' and 15'. Circuit regulator 16 is commonly known as a radio frequency tuner and, as pointed out above, functions as means for compensating for variations in the character of the article 9 being treated. The said circuit regulator 16 is connected through lead wire 17 to a radio frequency oscillator 18 and through lead wire 19 to a power indicating meter 20. Said indicating meter 20 is in turn connected through the lead wire 21 to the radio frequency oscillator 18. The said power indicating meter 20 has indicating and contact making means 31 adapted to engage contact 32 to complete a second circuit which is connected to one side of the power source through lead wires 22 and 30 and is connected to the other side of the power source through lead wire 29, solenoid 26 and lead wire 27. Solenoid 26 is arranged to operate a movable contact 25 to make and break a third circuit. This third circuit also embodies lead wires 30 and 22 connecting it to one side of the power source, lead wire 22 being connected to solenoid 23 which in turn is connected to the other side of the power source through lead wire 24, the above mentioned contact 25 and lead wires 34 and 27.

The engagement of the contact making means 31 with the contact 32 functions to energize the solenoid relay 26 whereupon a magnetic field will be generated tending to attract the movable contact 25 causing said contact 25 to be moved toward said solenoid relay 26. The movable contact 25 when out of engagement with the solenoid relay 26 is adapted to be held in engagement with a fixed contact 33 by means of a suitable coil spring 35. The fixed contact is connected through the lead wire 34 to the circuit wire 27.

It is to be noted that the solenoid 23 is provided with a core 36 which is part of the support 8.

There is provided, beneath the heating chamber 4, a pair of air jets 37 and 38 between which the article or lens 9 is adapted to be located when allowed to move outwardly of the heating chamber 4. It is to be understood that the air jets 37 and 38 are connected with a suitable air line for producing a blast of air therethrough.

The function of the device is substantially as follows:

Heat is generated internally of the heating chamber 4 by energizing the pre-heating element 5.

When it is desired to harden or temper the lens 9, the lens 9 is placed in the holding jaws 39 of the support 8. The said support will be in its lowermost position when this takes place. The power is then turned on at the source of electrical energy 28 causing said electrical energy to energize the solenoid 23 of the third circuit whereupon the core 36 responding to said energizing will cause the support 8 and the lens 9 carried thereby to be raised into the heating chamber 4 and into alignment with the pre-heating element 5. This energizing takes place because of the fact that the movable contact 25 is now held in engaged relation with the stationary contact 33 by the coil spring 35. The glass article or lens 9 is thereby subjected to the heat generated internally of the heating chamber 4 by the pre-heating element 5. It is particularly pointed out that this pre-heating is primarily for the purpose of conditioning the glass or reducing its electrical resistance to the point where it will respond to induction heat generated by the induction coils 6 and 6'. It would therefore be in keeping with the invention to preheat the lens 9 by other suitable means before being positioned between the induction coils 6 and 6'.

It is well known that glass at ordinary room temperature has high electrical resistance and that upon heating this electrical resistance is greatly reduced so that by subjecting the glass article or lens 9 to heat generated by the pre-heating element 5 the electrical resistance of the article 9 is reduced by an amount sufficient to cause the electrical currents to flow through the opposed surfaces of the glass article as induced under the influence of the induction coils 6 and 6'. This causes the temperature of the article to be raised a desired controllable amount as regulated by the radio frequency tuner 16. The energy being absorbed by the glass will change the tuning of the circuit and this factor may be utilized so that a predetermined change in the indication of the meter 20 will produce contact of the elements 31 and 32 and energize the second circuit. The position of contact between the elements 31 and 32 may be varied according to the amount of heat to be generated in the article 9 or the radio frequency tuner may be adjusted to produce a like result by changing the efficiency of transfer of the high frequency current from the oscillator to article 9.

When the desired amount of heat is generally through induction in the article 9 and the contact elements 31 and 32 engage each other, this causes the solenoid relay 26 of the second circuit to be energized whereby the movable contact 25 will be drawn into engagement with said solenoid relay 26 against the action of the resilient means 35. This causes the movable contact 25 of the third circuit to disengage with the fixed contact 33 causing the solenoid coil 23 to be de-energized whereby the support 8, under the action of gravity, will move downwardly with respect to the heating chamber 4 thereby causing the article or lens 9 to be moved into alignment with the air jets 37 and 38. A suitable stop 40 is provided on the support for limiting said downward movement. This stop may be of a hydraulic type for cushioning the stopping of the downward movement of the support. This operation is purely automatic and takes place only when the article 9 has been heated to the proper temperature.

The support 8 has been described thus far as being movable in a vertical direction with respect to the heating chamber through openings 7' and 7 formed in the upper and lower walls of the chamber; it is to be understood, however, that openings 41 and 42, as shown in Fig. 3, may be formed in the front and rear walls of the chamber, if desired, and that the support 8' may be then disposed in a horizontal direction. In this arrangement, resilient means 43 are associated with said support 8' for moving the work holding portion of said support outwardly of the heating compartment when the solenoid 23 is de-energized.

Although the jets 37 and 38 have been described above as being connected with suitable means for producing a blast of air, it is to be understood that any other suitable quenching medium may be directed therethrough. It is to be understood that the quenching medium may be continuously flowing through the jets 37 and 38 or may be caused to flow therethrough only when the article 9 is centered with respect to or aligned with the jets or just prior thereto whereupon movement of the support 8 upwardly or support 8' forwardly to move the article or lens 9 into the chamber will cause the flow of medium through the jets 37 and 38 to be discontinued.

It is to be noted that as the glass becomes warm it becomes more conducting and the fact that it does become more conducting in the circuit shown means that that it will absorb an increasing amount of power from the oscillator through the induction coils 6—6'. Because the power is increasing as the temperature rises, the controls may be so proportioned as to cause the members 31 and 32 to make contact at a predeterminable point which, for a given article, will definitely indicate the temperature of the article and will thereby provide a positive and primary means of indicating its body temperature. This thereby provides a more positive control of the actual temperature of the body of the article 9. It is to be understood that the setting of the position of contact of the members 31 and 32 determines the power level at which the contact will occur.

The function of the tuner is for the efficient transfer of power from the oscillator to the coils 6 and 6'. The reason for needing a controllable means here is that the effective load of the coil will be determined in some measure by the actual resistance load of the article 9 being heated. In other words as the article 9 begins to take energy or absorb energy the apparent resistance of the coils 6 and 6' increases and instead of being a pure inductor as it would be without the load 9, it becomes a combination of inductance and resistance. The tuner can be used to effect an efficient transfer of energy from the oscillator to the inductors in any given set of load conditions. Therefore, after once having determined the character of the article, the tuner may be set at the proper load required for generating the heat desired in said article.

From the foregoing description it will be seen that simple, efficient and economical means and method have been provided for accomplishing all of the objects and advantages of the invention.

Having described my invention, I claim:

1. A device for tempering glass articles such as plates and lenses comprising a work holder adapted to support a glass article with its opposed surfaces in approximately vertical planes, a pair of induction coils adapted to be disposed on the opposed sides of said article in spaced overlying relation with the respective surfaces of said article and so that said surfaces are each within the effective range of a respective induction coil, a circuit for connecting said induction coils with a source of electrical energy, heat generating means for converting said glass article to a conductor where it will absorb electrical energy from the induction coils, quenching means for quenching the article, means in said circuit for detecting changes in the flow of electrical energy therethrough as effected by the converting of the glass article to a conductor, and control means operable by said detecting means upon a predeterminable change in the flow of electrical energy through said circuit whereby the article may be quenched when the article itself has been raised to a desired temperature.

2. A device for tempering glass articles such as plates and lenses comprising a heating chamber having an entrance opening and quenching means spaced from said opening, a work holder adapted to support a glass article at a first position to be quenched by the quenching means and movable through said entrance opening to position the article in the heating chamber, induction coils in said chamber located to be disposed on the opposed sides of said article when positioned in the chamber and so that said surfaces of the article are within the effective range of said induction coils, a circuit for connecting said induction coils with a source of electrical energy, means for generating heat in the chamber sufficient to cause said article to absorb electrical energy from the induction coils, means in said circuit detecting changes in the flow of electrical energy therethrough, and control means operable by said detective means upon a predeterminable change in the flow of electrical energy through said circuit to the induction coils to cause the work holder to move the glass article from its position in the heating chamber to said first position to be quenched by the quenching means.

3. A device for tempering glass articles such as plates and lenses comprising a heating chamber having an entrance opening and quenching means spaced from said opening, a work holder adapted to support a glass article to be quenched by the quenching means and movable through said entrance opening to position the article in the heating chamber, a pair of spiral shaped induction coils in said chamber located to be disposed on the opposed sides of said article when positioned in the chamber and so that said surfaces of the article are within the effective range of said induction coils, said coils being shaped to assume a shape substantially corresponding to the shape of the adjacent surface of the article, a circuit for connecting said induction coils with a source of electrical energy, means for generating heat in the chamber sufficient to cause said article to absorb electrical energy from the induction coils, metering means in said circuit for determining changes in the flow of electrical energy therethrough, and control means operable by said metering means upon a predeterminable change in the flow of electrical energy through said circuit to the induction coils, said control means when so operated causing the work holder to move the glass article from its position in the heating chamber to said first position to be quenched by the quenching means.

4. A device for tempering glass articles such as plates and lenses comprising heat generating means and quenching means spaced therefrom, a movable work holder adapted to support a glass article to be heated by the heat generating means, a pair of spiral shaped induction coils adapted to be disposed on the opposed sides of said article in spaced alignment with the opposed surfaces thereof and so that said opposed surfaces of the article are within the effective range of said induction coils, a circuit for connecting said induction coils with a source of electrical energy, said heat generating means being adapted to cause said article to absorb electrical energy from the induction coils, metering means for measuring changes in the flow of electrical energy in said circuit and control means operable by said metering means upon a predeterminable change in the flow of electrical energy through said circuit to the induction coils to cause the work holder to move the glass article to a position where it will be quenched by the quenching means.

5. A device for hardening lenses formed of glass comprising a heating chamber having an entrance opening thereto, quenching means spaced from said entrance opening, a work holder having means for holding a lens with its surfaces in substantially vertical planes, said work holder being movable between a pair of stations, one of said stations being located to position the lens to be quenched by the quenching means, and the second station being located to position the lens in the heating chamber, and supporting means for maintaining said work holder at said second station against a force urging the holder to return to the first station, induction coil means of a flat spiral shape positioned in the heating chamber adjacent said second station so as to be in spaced alignment with the surface of the lens when in the heating chamber, and with said surface of the lens being disposed within the effective range of said induction coil means, a first circuit connecting said induction coil means with a suitable source of electrical energy, heat generating means for heating the interior of said heating chamber to a temperature at which the lens will absorb energy from the induction coil means, a second circuit connectable with a source of electrical energy, and switch means in said second circuit responsive to changes in the flow of electrical energy in the first circuit connecting the induction coil to a source of electrical energy, said switch means being operated to complete said second circuit when a predeterminable amount of energy has been absorbed by the lens from the induction coil means, and control means operable by the completion of said second circuit to cause the supporting means to allow the work holder to return to its first station where the lens will be positioned to be quenched by the quenching means.

6. A device for hardening lenses formed of glass comprising a heating chamber having an entrance opening thereto, quenching means spaced from said entrance opening, a work holder having means for holding a lens with its surfaces in substantially vertical planes, said work holder being movable between a pair of stations, one of said stations being located to position the lens to be quenched by the quenching means, and the second station being located to position the lens in the heating chamber, and supporting means for maintaining said work holder at said second station against a force urging the holder to return to the first station, a pair of substantially flat spiral shaped induction coils positioned in the heating chamber adjacent said second station so as to be in spaced alignment with the opposed surfaces of the lens when in the heating chamber, and with a respective surface of the lens disposed within the effective range of a respective induction coil, a first circuit containing a radio frequency oscillator and connecting said induction coils with a suitable source of electrical energy, heat generating means for heating the interior of said heating chamber to a temperature at which said surfaces of the lens will absorb energy from the induction coils, a second circuit, and switch means in said second circuit operatively associated with said first circuit to respond to a predetermined change in the flow of electrical energy to the induction coil and complete said second circuit, and control means operable by completion of said second circuit to cause the supporting means to allow the work holder to return to its first station where the lens will be positioned to be quenched by the quenching means.

7. A device for hardening glass articles such as lenses and plates comprising a heating chamber having an entrance opening thereto, quenching means spaced from said entrance opening, a work holder having means for holding an article with its surfaces in approximately vertical planes, said work holder being movable between a pair of stations, one of said stations being located to position the article to be quenched by the quenching means, and the second station being located to position the article in the heating chamber, and supporting means for maintaining said work holder at said second station against a force urging the holder to return to the first station, a pair of induction coils positioned in the heating chamber adjacent said second station so as to overlie in spaced alignment the opposed surfaces of the article when in the heating chamber, said coils each being shaped to overlie in substantially uniform spaced relation an adjacent surface of the article and disposed to have said surface of the article within the effective range of the coil, a first circuit connecting said induction coils with a suitable source of electrical energy, heat generating means for heating the interior of said heating chamber to a temperature at which the surfaces of the article will absorb energy from the induction coils, a first relay circuit, switch means in said first relay circuit to open and close said relay circuit, and metering means in said first circuit responsive to changes in the flow of electrical energy to the induction coils, said switch means being normally open and operatively connected with the metering means to complete the first relay circuit when a predeterminable amount of energy has been absorbed by the article from the induction coils, a second relay circuit having a normally closed movable contact operated by said first relay circuit when the switch means is closed to open the said second relay circuit, and control means operable by the opening of said second relay circuit to cause the supporting means to allow the work holder to return to its first station where the article will be positioned to be quenched by the quenching means.

8. A device for hardening glass articles such as lenses and plates comprising heat generating means, quenching means and a work holder having means for holding the article with its surfaces in substantially vertical planes, said work holder being movable between a pair of stations, one of said stations being located to position the article to be quenched by the quenching means, and the second station being located to position the article to be heated by said heat generating means, supporting means for maintaining said work holder at said second station against a force urging the holder to return to the first station, a pair of induction coils of approximately flat spiral shape adapted to be in spaced alignment with the opposed surface of the article when at said second station, and with said surfaces of the article disposed within the effective range of said induction coils, a circuit connecting said induction coils with a suitable source of electrical energy, said heat generating means being adapted to heat the surfaces of the article to a temperature at which they will absorb energy from the induction coils, a second circuit and switch means in said curcuit for opening and closing said second circuit, means in said first circuit responsive to changes in the flow of electrical energy to the induction coil, said switch means being operatively connected with said change responsive means to complete the second circuit when a predeterminable amount of energy has been absorbed by the article from the induction coils, a third circuit having a make and break contact for opening and closing said circuit, and a solenoid in said second circuit operating on said make and break contact to open the third circuit when said second circuit is energized and to close said third circuit when the second circuit is open, and control means operable by the opening of said third circuit to cause the supporting means to allow the work holder to return to its first station where the article will be positioned to be quenched by the quenching means.

9. A device for hardening glass articles such as lenses and plates comprising a heating chamber having an entrance opening thereto, quenching means spaced from said entrance opening, a work holder having means for holding an article with its surfaces in approximately vertical planes, said work holder being movable between a pair of stations, one of said stations being located to position the article to be quenched by the quenching means, and the second station being located to position the article in the heating chamber, and supporting means for maintaining said work holder at said second station against a force urging the holder to return to the first station, means for heating the article when positioned in the chamber to a temperature at which it will have conducting properties, a pair of induction coils positioned in the heating chamber adjacent said second station so as to be in spaced alignment with the opposed surfaces of the article when in the heating chamber, said coils each being shaped to approximately the size and shape of an adjacent surface of the article and adapted to be so spaced therefrom as to have said surface of the article within the effective range of the coil for inducing surface currents therein when energized, a circuit connecting said induction coils with a suitable source of electrical energy, a radio frequency oscillator in said circuit for introducing high frequency current in said circuit, said circuit further containing a metering device for detecting changes in the flow of electrical energy in said circuit as the raising of the temperature of the article effects the absorbing of energy from the adjacent induction coils, and control means operably connected with said metering device and adapted when a predeterminable amount of energy has been absorbed by the article from the induction coils to cause the supporting means to allow the work holder to return to its first station where the article will be positioned to be quenched by the quenching means.

10. A device for tempering glass articles such as plates and lenses comprising heat generating means for heating the article to a temperature at which it will have electrical conducting properties, a pair of induction coils, a movable work holder for supporting the article between said coils, said induction coils being disposed in spaced alignment with the opposed surfaces of said article when so supported and so as to have the article within the effective range of the induction coils when the coils are energized, a circuit for connecting said induction coils with a source of electrical energy, and a device having means in said circuit responsive to a predeterminable change in the flow of electrical energy through said circuit to the induction coils and having further means operatively connected therewith to move the work holder out of position between the coils and into position for subsequent quenching of the heated article upon determination of said change in the flow of electrical energy through the circuit to the induction coils.

11. A device for tempering glass articles such as plates and lenses, comprising quenching means, heat generating means for heating the articles to a temperature at which it will have electrical conducting properties, induction coil means, a work holder for supporting the article in spaced alignment with the induction coil means and within the effective range thereof, a circuit for connecting said induction coil means with a source of electrical energy, detecting means in said circuit detecting changes in the flow of electrical energy therethrough, and control means operated by said detecting means in response to a predetermined change in the flow of electrical energy through said circuit causing the article to be quenched by the quenching means.

12. A method of tempering glass lenses comprising the steps of positioning such lenses so that their opposed surfaces will assume a controlled relation with the fields of high frequency induction means, heating said lenses to a temperature where the electrical resistance of the glass thereof will be reduced by an amount sufficient to render them responsive to the current of the high frequency induction means, causing said high frequency induction means to induce surface current in said lenses of a frequency controlled to have little depth of penetration whereby the surfaces of said lenses will be heated to a controlled temperature above the interior thereof, and then quenching the lenses to place the outer surfaces thereof under compression and their interior under tension.

References Cited in the file of this patent

UNITED STATES PATENTS

| Number | Name | Date |
| --- | --- | --- |
| 1,367,124 | Colby | Feb. 1, 1921 |
| 1,572,873 | Allcutt | Feb. 16, 1926 |
| 1,687,656 | Brown | Oct. 16, 1928 |
| 1,799,102 | Kelley | Mar. 31, 1931 |
| 2,068,799 | Guyer | Jan. 26, 1937 |
| 2,178,520 | Howard | Oct. 31, 1939 |
| 2,179,261 | Keller | Nov. 7, 1939 |
| 2,186,718 | Ferguson | Jan. 9, 1940 |
| 2,306,054 | Guyer | Dec. 22, 1942 |
| 2,324,525 | Mittlemann | July 20, 1943 |
| 2,409,284 | Jackson | Oct. 15, 1946 |
| 2,455,085 | Oughton et al. | Nov. 30, 1948 |
| 2,462,205 | Machlett et al. | Feb. 22, 1949 |
| 2,522,949 | Jarman | Sept. 19, 1950 |
| 2,577,611 | Eves | Dec. 4, 1951 |

FOREIGN PATENTS

| Number | Country | Date |
| --- | --- | --- |
| 393,491 | Great Britain | June 8, 1933 |
| 431,095 | Great Britain | July 1, 1935 |